Jan. 2, 1945.  C. F. FRYLING  2,366,325
POLYMERIZATION OF DIENES
Filed May 10, 1940
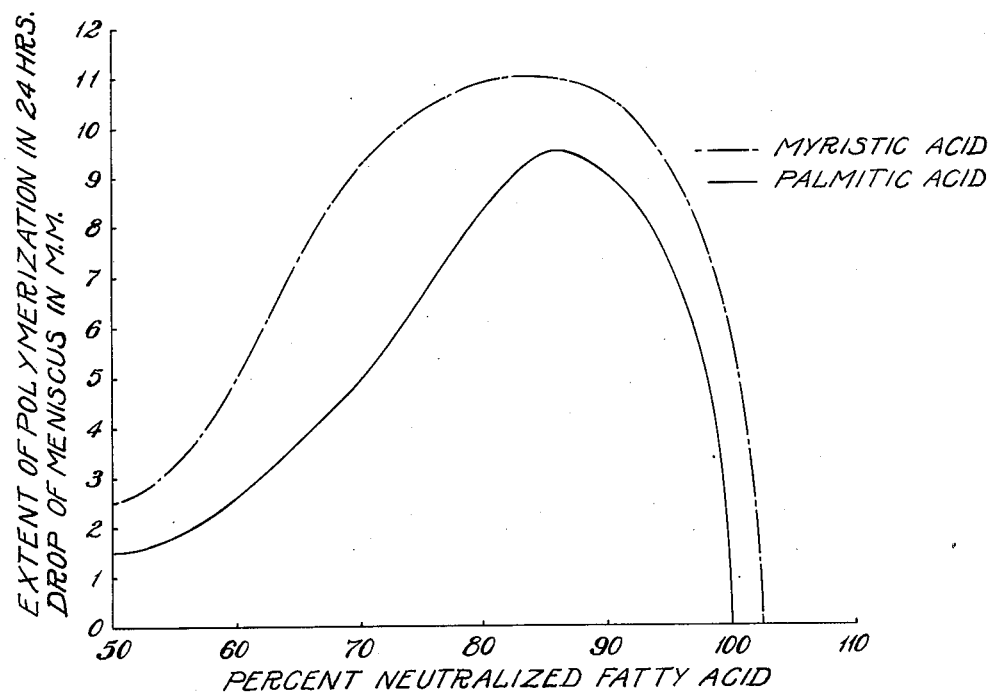

Patented Jan. 2, 1945

2,366,325

UNITED STATES PATENT OFFICE 2,366,325

POLYMERIZATION OF DIENES

Charles F. Fryling, Silver Lake, Ohio, assignor to
The B. F. Goodrich Company, New York, N. Y.,
a corporation of New York Application May 10, 1940, Serial No. 334,382

16 Claims. (Cl. 260—23)

This invention relates to the polymerization of butadiene-1,3 hydrocarbons such as butadiene or isoprene either alone or in admixture with one another or with other polymerizable compounds such as acrylonitrile, styrene, acrylic esters and the like to produce elastic, vulcanizable polymers which may be called synthetic rubber. The principal object of this invention is to provide an improved method of polymerization.

It is well known that the production of synthetic rubber by the polymerization of butadiene-1,3 hydrocarbons is often carried out with the monomer or monomer mixture in the form of a dispersion or emulsion in some non-solvent, usually water, in the presence of a suitable emulsifying agent and a catalyst or accelerator for the polymerization. A number of emulsifying agents of the general nature of soaps and a number of polymerization catalysts such as peroxides have already been proposed for use in the emulsion polymerization of butadiene-1,3 hydrocarbons. With the use of the materials already known, however, it is necessary to use rather high temperatures, namely over 40° C., and to allow considerable time for the polymerization to occur.

By this invention, it has been found that the velocity of such polymerizations is materially hastened, the temperature at which polymerization may be carried out is lowered, the yield of polymer is increased and the quality of the polymer is improved, when the polymerization is carried out in the presence of a free higher fatty acid such as myristic or palmitic acid.

In the following description of this invention reference will be made to the accompanying drawing which graphically illustrates the desired conditions to be used in carrying out a preferred embodiment of the invention as hereinafter described.

The essential feature of this invention is the presence of a free higher fatty acid during the emulsion polymerization of butadiene-1,3 hydrocarbons. The term higher fatty acid is meant to include those members of both saturated and unsaturated fatty acid series, such as the $C_nH_{2n}O_2$, $C_nH_{2n-2}O_2$ and $C_nH_{2n-4}O_2$ series, which contain at least 10 and not more than 20 carbon atoms per molecule. Such ordinary fatty acids as myristic, palmitic, stearic and oleic as well as mixtures of these such as are obtained by the hydrolysis of naturally occurring fats and oils are obviously within the scope of this invention. The term "free" as applied to higher fatty acids is hereinafter used to denote the fact that the fatty acid is present in a quantity in excess of that which is equivalent to the alkali or hydroxyl ions present; that is, that the fatty acid is present in a quantity greater than could be produced by simple hydrolysis of soap.

In addition to the free higher fatty acid, other substances which may be necessary or desired may also be present in the emulsion. As has been noted, a polymerization catalyst and an emulsifying agent are usually necessary for the polymerization to take place. Among the polymerization catalysts which have been used for promoting linear polymerization of butadiene-1,3 hydrocarbons are hydrogen peroxide, benzoyl peroxide, potassium persulfate, sodium perborate, diazoamino benzene and the like. While using any of these catalysts, an improvement in the rate of polymerization is brought about by the presence of a free higher fatty acid. Moreover, polymerization may take place in systems containing no added catalyst if a free fatty acid is present. However, the use of hydrogen peroxide as the catalyst together with a free higher fatty acid is particularly effective in promoting polymerization and is to be preferred in the practice of this invention.

The beneficial effect of free higher fatty acids on the polymerization of butadiene-1,3 hydrocarbons may also be observed while using any of the various emulsifying agents suitable for the purpose among which are: water soluble fatty acid soaps, hymolal sulfates or sulfonates, aromatic sulfonic acid salts, salts of organic bases and other substances having emulsifying properties.

Since fatty acid soaps serve well as emulsifying agents, a convenient and preferred manner of carrying out the present invention is to use a higher fatty acid together with a water soluble soap of that same acid as the emulsifying agent. In this case it is convenient to prepare an emulsifying solution containing both water soluble soap and an additional amount of free fatty acid, and then to emulsify the monomeric material with this solution. The emulsifying solution may be prepared in a number of different ways. For example, a fatty acid may be dispersed in water and the soap then formed by adding an alkali hydroxide such as sodium or potassium hydroxide. A part of the fatty acid is used in forming the soap while at the same time there is unneutralized fatty acid present in a concentration in excess of that which is equivalent to the concentration of alkali present in the aqueous soap solution. On the other hand an aqueous soap solution may be prepared and the fatty acid added as such to the soap solution, or the soap solution may be partially acidified with mineral acid thereby liberating a part of the fatty acids contained in the soap. In any event, the result is that an emulsifying solution is formed which contains both water soluble soap and free fatty acid in an excess over the alkali. The most desirable results are obtained when the fatty acid is partially neutralized with an alkali hydroxide to form the emulsifying solution.

The volume of emulsifying solution to be used for a given amount of polymerizable material, and the concentration of soap and fatty acid in the emulsifying solution may be varied over a wide range as the occasion demands. Although it is not intended to limit this invention to specific proportions it may be said that for each 100 parts of the monomers, from 150 to 300 parts of an aqueous solution containing 1 to 3% of fatty acid which is 70 to 95% neutralized with alkali is preferred.

The effect of varying the degree of neutralization upon the rate of polymerization is illustrated by the curves in the accompanying drawing. The data for these curves was obtained from a series of experiments in which palmitic or myristic acid was employed in preparing emulsions containing 7.5 g. of butadiene, 2.5 g. of acrylonitrile and 0.035 g. of hydrogen peroxide as well as 25 c. c. of an aqueous soap solution. The soap solutions contained 2% of the fatty acid and sufficient sodium hydroxide to bring about various degrees of neutralization of the fatty acid. The several emulsions were sealed in glass tubes and the tubes agitated for 24 hours at 30° C. The extent of polymerization was then determined by measuring the fall of the meniscus in the tubes brought about by the increase in density resulting from polymerization. In the curves the extent of polymerization is plotted against the per cent neutralization for palmitic and myristic acid.

It will be observed that the highest portions of the curves corresponding to the highest rate of polymerization lie well within the range of 70–95% neutralized acid. There is a very rapid decrease in the extent of polymerization as the concentration of free fatty acid approaches zero (corresponding to 100% neutralized acid). This shows the marked accelerating effect of free fatty acid upon the polymerization. It is also to be noted that myristic acid is more effective in promoting polymerization than is palmitic acid and that the extent of polymerization is not so sensitive to changes in per cent neutralization when myristic acid is used. Similar curves obtained with other of the fatty acids also show that myristic acid is most effective in promoting polymerization and is to be preferred in carrying out this invention.

It should be mentioned that in the experiments just described the fatty acids had been purified by vacuum distillation. Similar results are obtained when mixtures of fatty acids are used. For example, the mixture of fatty acids obtained by the hydrolysis of coconut oil or other naturally occurring oils or fats is effective in accelerating polymerization. Care should be observed, however, when using impure fatty acid mixtures since substances may be present which exert an inhibiting action on the polymerization.

The increase in the yield and the improved physical properties of the rubber-like polymers obtained when the polymerization is carried out in the presence of free fatty acid may be seen by an inspection of Table I. These results were obtained with a butadiene acrylonitrile system, the emulsions being prepared as follows:

| | Parts |
|---|---|
| Butadiene | 75 |
| Acrylonitrile | 25 |
| Hydrogen peroxide | .35 |
| Emulsifying solution (2% fatty acid) | 250 |

Those emulsions in which the fatty acid was 100% neutralized contained appreciably no free fatty acid and are to be compared with the emulsions in which the fatty acid was only partially neutralized. The tensile strengths and elongations listed in the table were determined in a typical tread stock on similarly compounded copolymer samples after coagulation of the polymerized emulsions.

Table I

| Fatty acid | Percent neutralized | Yield | Time | Temp. | Tens. | Elong. |
|---|---|---|---|---|---|---|
| | | Percent | Hours | °C. | | |
| Myristic | 85 | 99 | 48 | 30 | 5,175 | 600 |
| Do | 100 | 67 | 48 | 30 | 4,800 | 590 |
| Palmitic | 85 | 90 | 60 | 30 | 5,100 | 400 |
| Do | 100 | 84 | 60 | 30 | 3,150 | 480 |
| Coconut oil fatty acids | 85 | 95 | 90 | 30 | 3,700 | 400 |
| Do | 100 | 62 | 60 | 60 | 3,000 | 460 |

Table II shows the improvement in yield and physical properties brought about by the addition of myristic acid to a butadiene, acrylonitrile system containing hydrogen peroxide and emulsified with a 2% aqueous solution of sodium lauryl sulfate.

Table II

| Myristic acid (per cent based on diene mixture) | Yield | Time | Temp. | Tens. | Elong. |
|---|---|---|---|---|---|
| | Per cent | Hours | °C. | | |
| None | 54 | 436 | 45 | | |
| 0.5 | 80 | 299 | 45 | 4,800 | 630 |
| 0.75 | 86 | 233 | 30 | 5,400 | 590 |
| 1.0 | 98 | 160 | 30 | 5,800 | 650 |
| 2.0 | 99 | 40 | 30 | 5,500 | 700 |

The addition of equivalent amounts of sulfuric instead of myristic acid to this system did not produce this same accelerating effect on the polymerization, thus showing that myristic acid functions in some way other than merely changing the acidity of the emulsion.

Although this invention has been specifically described with reference to the polymerization of a butadiene-acrylonitrile mixture it is to be understood that the invention is equally applicable to any butadiene-1,3 hydrocarbon such as butadiene, isoprene, or dimethyl butadiene whether alone or mixed with one another and also mixtures containing a butadiene-1,3 hydrocarbon and other compounds capable of copolymerizing with butadiene-1,3 hydrocarbons in aqueous emulsion among which are unsaturated nitriles such as acrylonitrile and methacrylonitrile, aryl olefins such as styrene and vinyl naphthalene, esters of alpha-beta unsaturated acids such as methyl, ethyl or butyl acrylate or methacrylate, and other compounds.

Although the reasons for the remarkable influence of a free higher fatty acid on the emulsion polymerization of butadiene-1,3 hydrocarbons are not known with certainty, it is probable that several factors are involved in producing the result. One of these may be that by the use of a fatty acid it is possible to regulate the acidity of the emulsion without adding any electrolytes. Many inorganic ions and radicals are known to have an unfavorable effect on the polymerization hence the use of a fatty acid permits the attainment of the most desirable pH without otherwise disturbing the polymerization.

It is probable, however, that the function of the fatty acid is of a more fundamental nature than mere change of pH. It may be that fatty acids in the free state function as catalyst activators. At high hydrogen ion concentrations (low pH) there is little free fatty acid present due to its insolubility and its tendency to form dimers by association through a hydrogen bridge. At low hydrogen ion concentrations (high pH) the fatty acid is almost completely converted to its alkali salt. Therefore, at some intermediate pH, the concentration of fatty acid which may function as a catalyst activator is at a maximum. It may also be that the action of the fatty acid is largely a physical rather than a chemical phenomenon. This view is in harmony with the fact that a variation in the percentage neutralization of fatty acid soaps affects the surface tension and interfacial tension exhibited by emulsions of soap, water and mineral oil. (C. f. Cupples Ind. Eng. Chem. 31, 1307 (1939) and references cited.)

While it is not possible to explain the action of the fatty acid when applied in the process of this invention, the practical advantages of the invention have been herein pointed out and the preferred methods of carrying out the invention have been disclosed. It is not intended therefore that the invention be limited to any particular method of carrying out the invention, nor by any proposed theory, but only by the spirit and scope of the appended claims.

I claim:

1. The process which comprises polymerizing a butadiene-1,3 hydrocarbon in an aqueous emulsion containing a free higher fatty acid in a concentration in excess of that which is equivalent to the concentration of hydroxyl ions present.

2. The process which comprises polymerizing in aqueous emulsion a mixture of a butadiene-1,3 hydrocarbon and another unsaturated organic compound copolymerizable therewith in aqueous emulsion, in the presence of a free higher fatty acid in a concentration in excess of that which is equivalent to the concentration of hydroxyl ions present.

3. The process which comprises emulsifying a butadiene-1,3 hydrocarbon with an aqueous solution containing a water soluble fatty acid soap and a free higher fatty acid in a concentration in excess of that which is equivalent to the concentration of alkali present but less than the concentration of the fatty acid soap, and polymerizing the emulsion thus formed.

4. The process which comprises emulsifying a mixture of a butadiene-1,3 hydrocarbon and another unsaturated organic compound copolymerizable therewith in aqueous emulsion, with an aqueous solution containing a higher fatty acid and a sufficient amount of alkali to neutralize from 70 to 95% of said fatty acid, and polymerizing the emulsion thus formed.

5. The process which comprises polymerizing a butadiene-1,3 hydrocarbon in an aqueous emulsion containing an emulsifying agent, a polymerization catalyst and a free higher fatty acid in a concentration in excess of that which is equivalent to the concentration of hydroxyl ions present but less than the concentration of the emulsifying agent.

6. The process which comprises polymerizing a butadiene-1,3 hydrocarbon in an aqueous emulsion containing a fatty acid soap, hydrogen peroxide and myristic acid in a concentration in excess of that which is equivalent to the concentration of alkali present.

7. The process which comprises polymerizing a mixture including butadiene and acrylonitrile in the presence of water, an emulsifying agent, a polymerization catalyst and a free higher fatty acid in a concentration in excess of that which is equivalent to the concentration of hydroxyl ions present.

8. The process which comprises emulsifying a mixture including butadiene and acrylonitrile with an aqueous solution containing hydrogen peroxide, myristic acid and a sufficient amount of an alkali hydroxide to neutralize 70–95% of said myristic acid, and polymerizing the emulsion thus formed.

9. The process which comprises polymerizing a mixture including butadiene and styrene in the presence of water, an emulsifying agent, a polymerization catalyst and a free higher fatty acid in a concentration in excess of that which is equivalent to the concentration of hydroxyl ions present.

10. The process which comprises emulsifying a mixture including butadiene and styrene with an aqueous solution containing hydrogen peroxide, myristic acid and a sufficient amount of an alkali hydroxide to neutralize 70–95% of said myristic acid, and polymerizing the emulsion thus formed.

11. The process which comprises polymerizing a mixture including butadiene and methyl methacrylate in the presence of water, an emulsifying agent, a polymerization catalyst and a free higher fatty acid in a concentration in excess of that which is equivalent to the concentration of hydroxyl ions present.

12. The process which comprises emulsifying a mixture including butadiene and methyl methacrylate with an aqueous solution containing hydrogen peroxide myristic acid and a sufficient amount of an alkali hydroxide to neutralize 70–95% of said myristic acid, and polymerizing the emulsion thus formed.

13. A synthetic rubber of improved quality resulting from the polymerization of a butadiene-1,3 hydrocarbon in an aqueous emulsion containing a free higher fatty acid in a concentration in excess of that which is equivalent to the concentration of hydroxyl ions present.

14. A synthetic rubber of improved quality resulting from the copolymerization of butadiene and acrylonitrile, said polymerization being carried out in an aqueous emulsion containing a free higher fatty acid in a concentration in excess of that which is equivalent to the concentration of hydroxyl ions present.

15. A synthetic rubber of improved quality resulting from the copolymerization of butadiene and styrene, said polymerization being carried out in an aqueous emulsion containing a free higher fatty acid in a concentration in excess of that which is equivalent to the concentration of hydroxyl ions present.

16. A synthetic rubber of improved quality resulting from the copolymerization of butadiene and methyl methacrylate, said polymerization being carried out in an aqueous emulsion containing a free higher fatty acid in a concentration in excess of that which is equivalent to the concentration of hydroxyl ions present.

CHARLES F. FRYLING.